US010320815B2

(12) United States Patent
Wallace, III (10) Patent No.: US 10,320,815 B2
(45) Date of Patent: Jun. 11, 2019

(54) COMPUTER-IMPLEMENTED METHODS AND SYSTEMS FOR IDENTIFYING VISUALLY SIMILAR TEXT CHARACTER STRINGS

(71) Applicant: GreatHorn, Inc., Belmont, MA (US)

(72) Inventor: Raymond W. Wallace, III, Lunenburg, MA (US)

(73) Assignee: GreatHorn, Inc., Waltham, MA (US)

( * ) Notice: Subject to any disclaimer, the term of this patent is extended or adjusted under 35 U.S.C. 154(b) by 0 days.

(21) Appl. No.: 15/161,746

(22) Filed: May 23, 2016

(65) Prior Publication Data

US 2017/0339169 A1   Nov. 23, 2017

(51) Int. Cl.
| | |
|---|---|
| H04L 29/06 | (2006.01) |
| G06F 16/23 | (2019.01) |
| G06F 16/9535 | (2019.01) |
| G06F 16/2457 | (2019.01) |
| G06F 17/27 | (2006.01) |
| G06F 21/55 | (2013.01) |
| G06F 21/64 | (2013.01) |

(52) U.S. Cl.
CPC .......... *H04L 63/1416* (2013.01); *G06F 16/23* (2019.01); *G06F 16/24575* (2019.01); *G06F 16/9535* (2019.01); *G06F 17/273* (2013.01); *G06F 21/552* (2013.01); *G06F 21/64* (2013.01)

(58) Field of Classification Search
CPC ............... H04L 63/1416; G06F 17/273; G06F 17/30345; G06F 17/30528
See application file for complete search history.

(56) References Cited

U.S. PATENT DOCUMENTS

| | | | |
|---|---|---|---|
| 6,421,709 B1 | 7/2002 | McCormick et al. | |
| 7,644,127 B2 * | 1/2010 | Yu | H04L 51/12 709/206 |
| 8,869,269 B1 * | 10/2014 | Ramzan | H04L 63/1483 709/206 |
| 9,245,115 B1 | 1/2016 | Jakobsson | |
| 2005/0262210 A1 | 11/2005 | Yu | |
| 2012/0141031 A1 | 6/2012 | Boegelund | |

(Continued)

OTHER PUBLICATIONS

International Search Report and Written Opinion in International Application No. PCT/US2017/033995 dated Aug. 4, 2017.

(Continued)

*Primary Examiner* — Hee K Song
(74) *Attorney, Agent, or Firm* — Foley Hoag LLP; Rajesh Vallabh (57) ABSTRACT

Methods and systems are disclosed for selecting text character strings from a corpus of relevant strings that would commonly be considered to be visually similar to human viewer to an input string. The initial corpus may be any sufficiently broad or specific source of text, e.g., the names of users in a computer application system. The character strings in the corpus are classified such that direct, character-by-character comparisons may be limited to a small subset of likely-similar strings. The input string is then directly compared to strings that are likely to be similar to it, taking into account individual characters' similarities, combinations of characters that look similar to individual characters, transposition of characters, and simple additions and deletions.

18 Claims, 3 Drawing Sheets

|  | p | a | i | l |
|---|---|---|---|---|
| unmodified: | 3.0 | 2.0 | 1.0 | 1.0 |
| modified: | 3.0 | 1.5 | 0.5 | 0.25 |

Scalar Estimate: 5.25

(56) References Cited

U.S. PATENT DOCUMENTS

| | | | |
|---|---|---|---|
| 2013/0191469 A1* | 7/2013 | Dichiu | H04L 51/12 |
| | | | 709/206 |
| 2014/0115704 A1 | 4/2014 | Miller | |
| 2016/0004937 A1 | 1/2016 | Kurzer et al. | |
| 2016/0092557 A1 | 3/2016 | Stojanovic et al. | |
| 2016/0260033 A1* | 9/2016 | Keyngnaert | G06F 17/30634 |

OTHER PUBLICATIONS

Levenshtein, Vladimir I. (Feb. 1966). "Binary codes capable of correcting deletions, insertions, and reversals". Soviet Physics Doklady 10 (8): 707-710.).

* cited by examiner entertainment
entenainment
entertainmcnt
entertainment

FIG. 1A entertainment
entenainment
entertainmcnt
entertainment

|            | p   | a   | i   | l    |
|------------|-----|-----|-----|------|
| unmodified:| 3.0 | 2.0 | 1.0 | 1.0  |
| modified:  | 3.0 | 1.5 | 0.5 | 0.25 |

Scalar Estimate: 5.25

Score: 0.6

COMPUTER-IMPLEMENTED METHODS AND SYSTEMS FOR IDENTIFYING VISUALLY SIMILAR TEXT CHARACTER STRINGS

BACKGROUND

The present application relates generally to computer-implemented methods and systems for analyzing an input text character string to identify one or more visually similar text character strings in a corpus of such strings.

Electronic messaging systems that exchange information between business users are essential for the communication and operation of nearly every business. More than 135 billion email messages are sent to business users daily as of 2015, and this number is expected to continue to increase. In addition, real-time communication technologies such as text and video chat, intranet sites, SMS, and voice-over-IP are also seeing increased adoption.

Over 90% of all security incidents and data breaches begin when these technologies are used fraudulently, wherein an attacker manipulates these systems to send communications that appear to be from someone who is known to the recipient. These fraudulent messages are then used to gain illegitimate access to networks, computer systems, financial resources, and protected data, often for the financial gain of the impersonating party.

This is a significant problem because communications over network-based systems are largely unprotected in terms of identity validation, and the information accessible to the accounts used within those systems is often highly valuable. For example, a recipient of a fraudulent message may be a senior executive within a business unit, with the authority to authorize the wiring of funds to third parties. If a fraudulent message convinces him or her that it is from another executive, he or she may send funds to recipients who are not who the impersonated message claims them to be.

The reason is that email, chat, voice, and other network-based communication systems contain semi-structured data fields, such as "From:" and "To:" fields in an email, as well as unstructured data fields such as the message body or the content of the chat message being exchanged. Because both of these types of fields can be manipulated by a fraudulent party, and because no current standard exists that allows the recipient to verify that the author, sender, or creator of any individual message is who they claim to be, these attacks can be highly effective.

As a result, the use of fraudulent communication messages exchanged over a network is expected to grow as the use of these systems continues to increase. Preventing fraudulent activity without impeding the flow of legitimate communication is a particular problem for managers of information technology systems, as these managers are responsible for both determining what is and is not legitimate while simultaneously ensuring that the deliverability of communications is not delayed or prevented. Performing both of these functions simultaneously requires the information technology manager to rapidly identify extremely nuanced details about each messages structured and unstructured data fields, and to do so without slowing the rate of communications such that business processes are impacted.

Despite this contradictory set of requirements, regulatory and audit frameworks such as the Health Insurance Portability and Accountability Act of 1996 and the Sarbanes-Oxley Act may require information technology managers to track and protect against the exposure of data that is linked to these kinds of communication system accounts.

Various embodiments disclosed herein relate to improved techniques for separating legitimate and illegitimate messages within these systems, without introducing any delay to the use of these systems.

BRIEF SUMMARY OF THE DISCLOSURE

A computer-implemented method in accordance with one or more embodiments analyzes an input text character string to identify one or more visually similar text character strings in a corpus of text character strings. The method comprises the steps, each performed by a computer system, of: (a) receiving the input text character string; (b) determining a scalar estimate for the input text character string based on a model of visually similar text characters stored in a computer storage system, said model comprising a plurality of look-alike sets of text characters, each set having an assigned numerical value; (c) identifying a set of candidate text character strings from the corpus of text character strings stored in the computer storage system by comparing the scalar estimate of the input text character string with pre-calculated scalar estimates of each of said text character strings in the corpus, and selecting text character strings having scalar estimates within a given range of the scalar estimate of the input text character string; (d) analyzing the input text character string with each of the candidate text character strings to determine a visual similarity score between the input text character string and each of the candidate text character strings; and (e) identifying one or more candidate text character strings deemed to be most visually similar to the input text character string based on the similarity scores.

A computer system in accordance with one or more further embodiments comprises at least one processor, memory associated with the at least one processor, and a program supported in the memory for analyzing an input text character string to identify one or more visually similar text character strings in a corpus of text character strings, the program containing a plurality of instructions which, when executed by the at least one processor, cause the at least one processor to: (a) receive the input text character string; (b) determine a scalar estimate for the input text character string based on a model of visually similar text characters stored in a computer storage system, said model comprising a plurality of look-alike sets of text characters, each set having an assigned numerical value; (c) identify a set of candidate text character strings from the corpus of text character strings stored in the computer storage system by comparing the scalar estimate of the input text character string with pre-calculated scalar estimates of each of said text character strings in the corpus, and selecting text character strings having scalar estimates within a given range of the scalar estimate of the input text character string; (d) analyze the input text character string with each of the candidate text character strings to determine a visual similarity score between the input text character string and each of the candidate text character strings; and (e) identify one or more candidate text character strings deemed to be most visually similar to the input text character string based on the similarity scores.

BRIEF DESCRIPTION OF THE DRAWINGS

1B shows the example text strings of FIG. 1A, with the particular differences with the original underlined.

DETAILED DESCRIPTION

Spelling mistakes in natural writing are common because the pronunciation of one or more characters can, at times, differ very little from one or several other combinations of characters. People are generally good, however, at noticing these different arrangements of characters by sight. Though common misspellings may sound similar to the proper spelling of a word, they are generally visually discernable. When they know the correct spelling of a word, a human being is capable of noticing such transliterations.

Another class of misspellings, though may sound rather different when correctly pronounced, can be very difficult for a person to notice when reading from a page or computer screen. This kind of misspelling, when done with intention, can be used to fool even a very attentive person. This is the basis of the what is commonly known as a "homograph attack"—an attacker utilizes an otherwise legitimately named resource that is visually similar to a resource their victim is familiar with in order to fool the victim into taking some desired action, e.g., responding to financial request or providing information known to the victim.

Various embodiments disclosed herein are directed to methods and systems for determining the degree of similarity between two potentially unique but visually similar text character strings (representing, e.g., domain names used in email message exchanges), offering improved efficiency over existing string comparison techniques.

Techniques disclosed herein analyze an input text character string and select text character strings from a corpus of relevant strings that would commonly be considered to be visually similar to human viewer. The corpus may be any sufficiently broad or specific source of text, e.g., the names of users in a computer application system. The character strings in the corpus are classified such that direct, character-by-character comparisons may be limited to a small subset of likely-similar strings. The input string is then directly compared to strings that are likely to be similar to it, taking into account individual characters' similarities, combinations of characters that look similar to individual characters, transposition of characters, and simple additions and deletions.

A model of similar characters is used to determine whether two character strings are visually similar. The model used can depend greatly on the context the strings will be seen in, particularly common characteristics of the font faces used to display or print the strings. As such, specific applications of the techniques disclosed herein may use models tuned to the particular context of the application.

In separating the set strings from a given corpus of strings that are similar to an input or "suspect" string, it is preferable to know the exact Similarity Score of each pair of corpus and suspect strings. For large corpuses this is quite time consuming. As such, a Scalar Estimate of which "similarity class" each character string in the corpus is pre-calculated. A precise definition of a "similarity class" need not be made here, as its existence in the abstract is sufficient to calculate an approximation of what class a character string would belong to that is appropriate to compare to other Scalar Estimates.

Figure 1A:
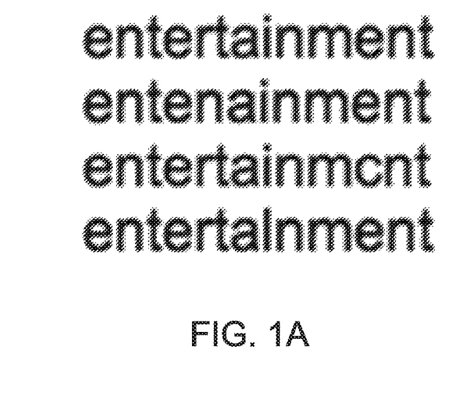
FIG. 1A shows a list of example text strings, all variations of the word "entertainment." Each variation differs from the original in a manner that makes it likely to be mistaken for the original word, especially when viewed in isolation. FIG.
Figure 1B:
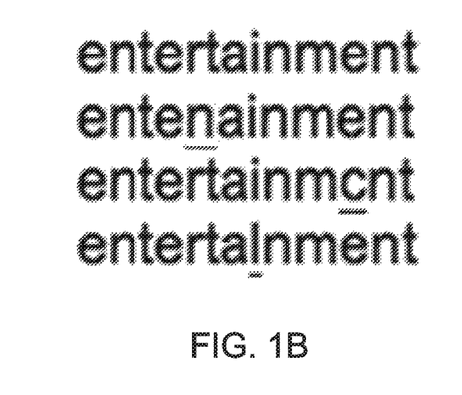
Figure 2:
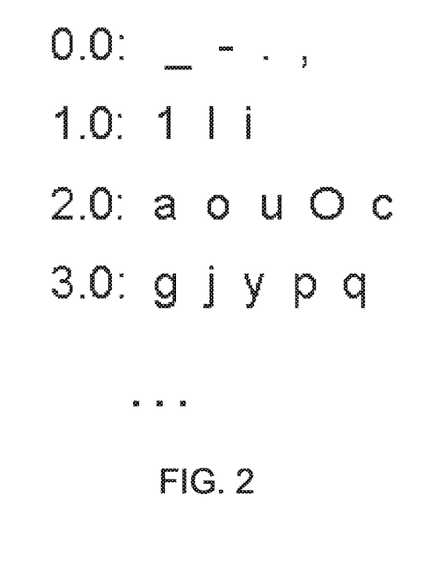
FIG. 2 shows an example of a partial look-alike set table, which is used to identify and score visually similar individual characters in accordance with one or more embodiments.

To the calculate the Scalar Estimate, the available set of characters is first portioned into approximate "look-alike sets," where each set contains characters that are visually similar (within the context of interest) enough. Each look-alike set should be similar in size, though they needn't be equal, and each character in the available character set should be represented in exactly one alike-set. Each look-alike set is given a numerical value arbitrarily. FIG. 2 shows an example of a partial look-alike set table used to identify and score visually similar individual characters in accordance with one or more embodiments.

Figure 3:
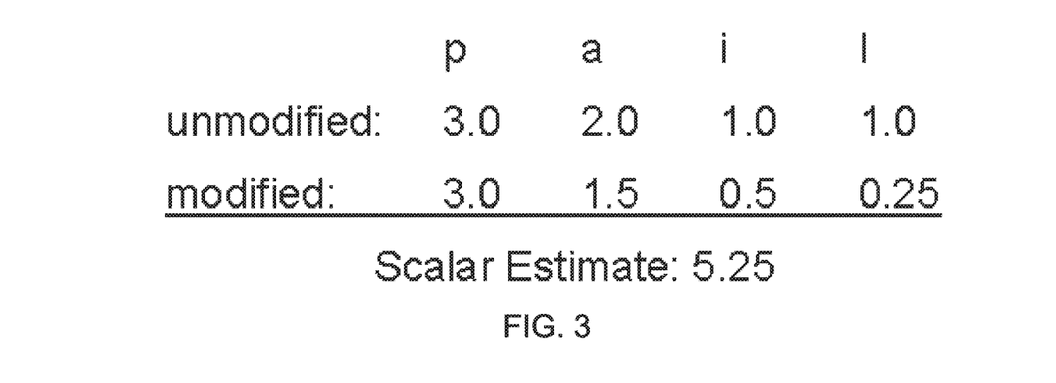
FIG. 3 shows an exemplary calculation for determining the Scalar Estimate of the word "pail" using the look-alike sets shown in FIG. 2.

For a given alike-set partitioning, an individual character string's Scalar Estimate is the sum of the numerical value of the string's characters, modified by their position in the string, such that characters nearest the start of the string are valued more closely to their alike-set value than those at the end, weighting the Estimate toward the front of the string— where a person's focus often lies when evaluating small strings. FIG. 3 shows an exemplary calculation for determining the Scalar Estimate of the word "pail" using the look-alike sets shown in FIG. 2.

The Scalar Estimate can be used to filter a large string corpus to a "candidate set" of only those strings whose Scalar Estimates are within a particular delta of the "suspect" string's Estimate. This delta should be chosen as appropriate to the corpus size and desired tolerance of the filter such that the candidate set is of a size small enough to be directly compared to the suspect string within the desired time constraints.

With the candidate set selected, the suspect string is compared to each string to find the string or strings that it is most visually similar to. This is a done by calculating a Similarity Score for each pairing of the suspect string with a character strings in the candidate set.

Prior to comparing the suspect string to the candidate set, a table of look alike-sets and "ligature" table is determined.

The table of alike-sets used to calculate a Similarity Score is similar to the alike-set partitioning used to calculate the Scalar Estimate, however not every character in the available character set need be represented in any alike-set, and a given alike-set should include only particularly visually similar characters, given the context the suspect string may be found in.

Figure 4:
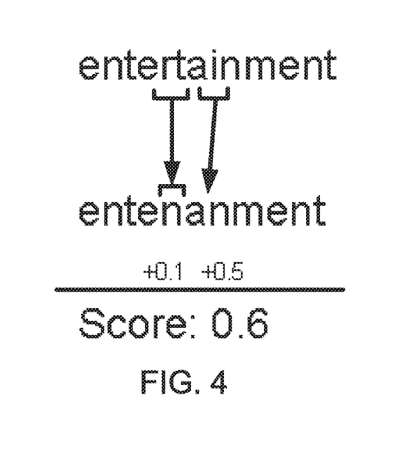
FIG. 4 is a visual depiction of an exemplary Comparison Score calculation in accordance with one or more embodiments, comparing the word "entertainment" to another character string bearing two differences from the word.

The ligature table is constructed as a mapping of input character strings to output character strings such that a given input string of one or two characters may be provided and, if the input string is present in the mapping, produce an output string that visually similar to the output. For example, in many common contexts, the input character string 'rn' is visually similar to the output character string 'm' as shown in FIG. 4.

For a given candidate string and suspect string, a Similarity Score is calculated from 0.0 when the two character strings are identical, to a value equal to the length of the longer of the two strings when similarities between the two character strings exist. Beginning at 0.0, the Score is increased for each instance where the character strings differ visually. The Score is increased by different amounts depending on the type of visual difference encountered:

Corresponding characters from the same look-alike set increases the Score by 0.1

A character in one character string corresponding to a "ligature" in the opposite character string increases the Score by 0.1

A transposition of corresponding pairs of characters increases the Score by 0.25

A character missing from one character string at a corresponding position in the other string increases the Score by 0.5

Corresponding characters that are strictly different increases the Score by 1.0

Where two types of visual difference might be represented by the same, or intersecting, corresponding characters, the choice of difference type(s) representing a lower overall Similarity Score is preferred.

As such, the overall Similarity Score is the sum of the scores of all visual differences between a given pair of character strings.

EXAMPLES

An exemplary computer-implemented method for identifying visually similar character strings in accordance with one or more embodiments is illustrated below. First, an input text string is analyzed to identify a set of possible strings that look visually similar to the input string.

(a) The available text characters are partitioned into rough look-alike sets, each given a different numerical value.

(b) An input text character string is processed, calculating a Scalar Estimate such that:
  (i) the Estimate begins at 0.0
  (ii) repeated characters—characters identical the character that precedes them—are discarded
  (iii) each remaining character is assigned the numerical value of the look-alike set it belongs to
  (iv) the numerical value of each character is modified by multiplying the numerical value by the ratio of the distance of the character's position from the end of the "input" string and the full length of the string
  (v) each modified numerical value is added to the Estimate (c) The final Scalar Estimate places the string in an approximate class of character strings which encompasses at least the possible strings that look visually similar to the input string.

A method In accordance with one or more further embodiments includes the following steps:

(a) The available text characters are partitioned into look-alike sets—sets of characters that look similar.

(b) The available text characters are partitioned into a ligature table—a look up table mapping individual key characters to specific ligature character strings that look similar to the key character.

(c) Two character strings, the "suspect" (i.e., input) and "candidate" strings, are compared by a backtracking process, wherein characters of corresponding string positions are compared and a Similarity Score is calculated:
  (i) the Score begins at 0.0
  (ii) the position in the "suspect" and "candidate" strings begins at their first character
  (iii) for each iteration, one of the following options is chosen such that the Score is minimized:
    1. if the two current characters are identical, the Score is not changed and both string positions are advanced by one
    2. if the two current characters belong to the same look-alike set, the Score is increased by 0.1 and both string positions are advanced by one
    3. if the current character in the "suspect" string is a key character in the ligature table and the current and next characters in the "candidate" string are the corresponding ligature character string, the Score is increased by 0.1 and the "suspect" string is advanced by one and the "candidate" string is advanced by two
    4. if the current character in the "candidate" string is a key character in the ligature table and the current and next characters in the "suspect" string are the corresponding ligature character string, the Score is increased by 0.1 and the "candidate" string is advanced by one and the "suspect" string is advanced by two
    5. if the current character in the "candidate" string is identical to the next character in the "suspect" string and the current character in the "suspect" string is identical to the current character in the "candidate" string, the Score is increased by 0.25 and both string positions are advanced by two
    6. if the current character in the "suspect" string is identical to the next character in the "candidate" string, the Score is increased by 0.5 and the "suspect" string position is advanced by one and the "candidate" string position is advanced by two
    7. if the current character in the "candidate" string is identical to the next character in the "suspect" string, the Score is increased by 0.5 and the "candidate" string position is advanced by one and the "suspect" string position is advanced by two
    8. otherwise, the Score is increased by 1.0 and both string positions are advanced by one
  (iv) when one of the character strings is exhausted, the total number of characters remaining in the other string as added to the Score
  (v) the final Similarity Score represents how visually similar the two character strings would appear on a computer screen, where two completely identical character strings would result in a Score of 0.0 and the more visually different the two character strings, the higher the Score.

A method in accordance with one or more further embodiments includes the following steps:

(a) A "suspect" text character string and a set of "corpus" text character strings are considered.

(b) The Scalar Estimate, as described above, is calculated for the "suspect" character string.

(c) The Scalar Estimate, as described above, is calculated for each of the "corpus" character strings.

(d) Of the set of "corpus" strings, a sub-set of "candidate" strings is defined such that the absolute difference between the Scalar Estimate of a "candidate" and the Scalar Estimate of the "suspect" string is less than a chosen Delta Value.

(e) For each "candidate" string, a Similarity Score, as above, is calculated for the "candidate" string and the "suspect" string.

(f) The set of "candidate" character strings is ordered by the calculated Similarity Score.

(g) Of the initial set of "corpus" character strings, the "candidate" string or strings with the lowest Similarity Scores are the most visually similar to the "suspect" string.

Figure 5:
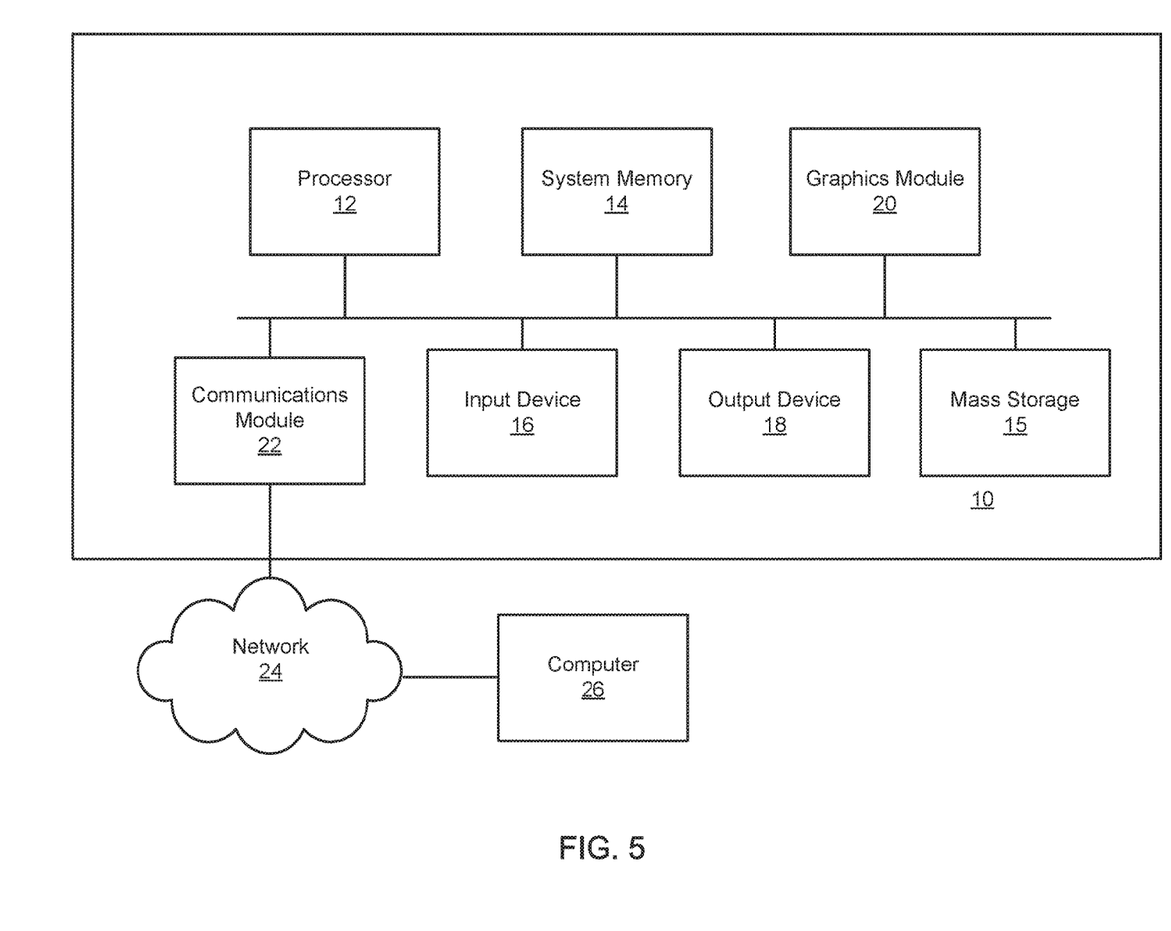
FIG. 5 is a simplified block diagram illustrating an exemplary computer system for identifying visually similar text character strings in accordance with one or more embodiments.

The techniques for identify visually similar text character strings described herein may be implemented in one or more computer programs executing on a programmable computer system. FIG. 5 is a simplified block diagram illustrating an exemplary computer system 10, on which the computer programs may operate as a set of computer instructions. The computer system 10 includes at least one computer processor 12 and a system memory 14 (including a random access memory and a read-only memory) readable by the processor 12. The computer system also includes a mass storage device 15 (e.g., a hard disk drive, a solid-state storage device, an optical disk device, etc.). The computer processor 12 is capable of processing instructions stored in the system memory or mass storage device. The computer system additionally includes input/output devices 16, 18 (e.g., a display, keyboard, or pointer device), a graphics module 20 for generating graphical objects, and a communication module or network interface 22, which manages communication with other computer systems 26 via the Internet or other communications network or combination of networks 24. Each computer program can be a set of instructions or program code in a code module resident in the random access memory of the computer system. Until required by the computer system, the set of instructions may be stored in the mass storage device or on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

What is claimed is:

1. A computer-implemented method for improving computer network security by analyzing an input text character string comprising a plurality of text characters identifying a resource in an electronic communication addressed to a recipient to identify one or more visually similar text character strings in a corpus of text character strings, the method comprising the steps, each performed by a computer system, of:

(a) receiving the input text character string;
    (b) determining a scalar estimate for the input text character string based on a model of visually similar text characters stored in a computer storage system, said model comprising a plurality of look-alike sets of text characters, each set having a unique assigned numerical value for that set, and said scaler estimate being calculated at least in part using the numerical values of one or more of said sets in which each of the plurality of text characters of the input text character string is represented;
    (c) identifying a set of candidate text character strings from the corpus of text character strings stored in the computer storage system by comparing the scalar estimate of the input text character string with precalculated scalar estimates of each of said text character strings in the corpus, and selecting text character strings having scalar estimates within a given range of the scalar estimate of the input text character string;
    (d) analyzing the input text character string with each of the candidate text character strings to determine a visual similarity score between the input text character string and each of the candidate text character strings;
    (e) identifying one or more candidate text character strings deemed to be most visually similar to the input text character string based on the similarity scores; and
    (f) flagging the electronic communication to alert the recipient of a potentially illegitimate communication when the similarity score of the one or more text character strings deemed to be most visually similar to the input text character string is within a given similarity threshold.

2. The method of claim 1, wherein the resource comprises a domain name and the electronic communication comprises an e-mail message, and the method is used to identify fraudulent e-mail messages.

3. The method of claim 1, the scalar estimate of the input text character string is determined in step (b) based on the sum of the numerical value of each character in the input string, modified by its position in the string such that the numerical values of characters nearer to the start of the string are given greater weight than the numerical values of the characters nearer to the end of the string.

4. The method of claim 1, wherein the visual similarity scores determined in step (d) are based on individual character similarities, combinations of characters that look similar to individual characters, transposition of characters, and/or simple additions and deletions of characters.

5. The method of claim 1, wherein step (d) includes comparing characters of the input text character string with characters in each of the candidate text character strings using a table of look-alike sets, each set comprising visually similar characters.

6. The method of claim 1, wherein step (d) includes comparing characters of the input text character string with characters in each of the candidate text character strings using a ligature table mapping individual characters with a ligature character string having a similar visual appearance.

7. The method of claim 1, wherein determining a scalar estimate for the input text character string based on the model of visually similar text characters in step (b) comprises:

(i) discarding one or more characters in the input text character string that are identical to a preceding character;
    (ii) assigning each remaining character the numerical value of the look-alike set it belongs to;
    (iii) modifying the numerical value assigned to each character by multiplying the numerical value by the ratio of the distance of the character's position from the end of the input text character string and the full length of the input text character string; and
    (iv) adding the modified numerical values assigned to each character to determine the scalar estimate.

8. The method of claim 1, wherein the text characters are partitioned into look-alike sets of characters that look similar, and the text characters are also partitioned into a ligature table mapping individual key characters to particular ligature character strings that look similar to the key characters, wherein analyzing the input text character string with each of the candidate text character strings to determine a visual similarity score in step (d) comprises assigning a starting similarity score of 0.0, and starting at the first character in the input text character string and a first character in a candidate text character string, choosing for each comparison iteration, one of the following options such that the visual similarity score is minimized:

(i) if the corresponding characters in the input text character string and the candidate text character string are identical, the similarity score is not changed and both string positions are advanced by one;

(ii) if the corresponding characters in the input text character string and the candidate text character string belong to the same look-alike set, the similarity score is increased by 0.1 and both string positions are advanced by one;

(iii) if the current character in the input text character string is a key character in the ligature table and the current and next characters in the candidate text character string are the corresponding ligature character string in the ligature table, the similarity score is increased by 0.1, the input text character string is advanced by one, and the candidate text character string is advanced by two;

(iv) if the current character in the candidate text character string is a key character in the ligature table and the current and next characters in the input text character string are the corresponding ligature character string in the ligature table, the similarity score is increased by 0.1, the candidate text character string is advanced by one, and the input text character string is advanced by two;

(v) if the current character in the candidate text character string is identical to the next character in the input text character string and the current character in the input text character string is identical to the current character in the candidate text character string, the similarity score is increased by 0.25 and both string positions are advanced by two;

(vi) if the current character in the input text character string is identical to the next character in the candidate text character string, the similarity score is increased by 0.5 and the input text character string position is advanced by one and the candidate text character string position is advanced by two;

(vii) if the current character in the candidate text character string is identical to the next character in the input text character string, the similarity score is increased by 0.5 and the candidate text character string position is advanced by one and input text character string position is advanced by two; and (viii) otherwise, the similarity score is increased by 1.0 and both string positions are advanced by one;

wherein when one of the character strings is exhausted, the total number of characters remaining in the other string as added to the similarity score; and wherein the final similarity score represents how visually similar the two character strings would appear on a computer screen, where two completely identical character strings would result in a similarity score of 0.0 and the more visually different the two character strings, the higher the similarity score.

9. The method of claim 1, wherein each text character in said model is represented in exactly one look-alike set.

10. A computer system, comprising:
at least one processor;
memory associated with the at least one processor; and
a program supported in the memory for improving computer network security by analyzing an input text character string comprising a plurality of text characters identifying a resource in an electronic communication addressed to a recipient to identify one or more visually similar text character strings in a corpus of text character strings, the program containing a plurality of instructions which, when executed by the at least one processor, cause the at least one processor to:

(a) receive the input text character string;

(b) determine a scalar estimate for the input text character string based on a model of visually similar text characters stored in a computer storage system, said model comprising a plurality of look-alike sets of text characters, each set having a unique assigned numerical value for that set, and said scaler estimate being calculated at least in part using the numerical values of one or more of said sets in which each of the plurality of text characters of the input text character string is represented;

(c) identify a set of candidate text character strings from the corpus of text character strings stored in the computer storage system by comparing the scalar estimate of the input text character string with precalculated scalar estimates of each of said text character strings in the corpus, and selecting text character strings having scalar estimates within a given range of the scalar estimate of the input text character string;

(d) analyze the input text character string with each of the candidate text character strings to determine a visual similarity score between the input text character string and each of the candidate text character strings;

(e) identify one or more candidate text character strings deemed to be most visually similar to the input text character string based on the similarity scores; and (f) flag the electronic communication to alert the recipient of a potentially illegitimate communication when the similarity score of the one or more text character strings deemed to be most visually similar to the input text character string is within a given similarity threshold.

11. The system of claim 10, wherein the resource comprises a domain name and the electronic communication comprises an e-mail message, and the system is used to identify fraudulent e-mail messages.

12. The system of claim 10, the scalar estimate of the input text character string is determined in (b) based on the sum of the numerical value of each character in the input string, modified by its position in the string such that the numerical values of characters nearer to the start of the string are given greater weight than the numerical values of the characters nearer to the end of the string.

13. The system of claim 10, wherein the visual similarity scores determined in (d) are based on individual character similarities, combinations of characters that look similar to individual characters, transposition of characters, and/or simple additions and deletions of characters.

14. The system of claim 10, wherein (d) includes comparing characters of the input text character string with characters in each of the candidate text character strings using a table of look-alike sets, each set comprising visually similar characters.

15. The system of claim 10, wherein (d) includes comparing characters of the input text character string with characters in each of the candidate text character strings using a ligature table mapping individual characters with a ligature character string having a similar visual appearance.

16. The system of claim 10, wherein determining a scalar estimate for the input text character string based on the model of visually similar text characters in (b) comprises:
(i) discarding one or more characters in the input text character string that are identical to a preceding character;
(ii) assigning each remaining character the numerical value of the look-alike set it belongs to;
(iii) modifying the numerical value assigned to each character by multiplying the numerical value by the ratio of the distance of the character's position from the end of the input text character string and the full length of the input text character string; and
(iv) adding the modified numerical values assigned to each character to determine the scalar estimate.

17. The system of claim 10, wherein the text characters are partitioned into look-alike sets of characters that look similar, and the text characters are also partitioned into a ligature table mapping individual key characters to particular ligature character strings that look similar to the key characters,
wherein analyzing the input text character string with each of the candidate text character strings to determine a visual similarity score in (d) comprises assigning a starting similarity score of 0.0, and starting at the first character in the input text character string and a first character in a candidate text character string, choosing for each comparison iteration, one of the following options such that the visual similarity score is minimized:
(i) if the corresponding characters in the input text character string and the candidate text character string are identical, the similarity score is not changed and both string positions are advanced by one;
(ii) if the corresponding characters in the input text character string and the candidate text character string belong to the same look-alike set, the similarity score is increased by 0.1 and both string positions are advanced by one;
(iii) if the current character in the input text character string is a key character in the ligature table and the current and next characters in the candidate text character string are the corresponding ligature character string in the ligature table, the similarity score is increased by 0.1, the input text character string is advanced by one, and the candidate text character string is advanced by two;
(iv) if the current character in the candidate text character string is a key character in the ligature table and the current and next characters in the input text character string are the corresponding ligature character string in the ligature table, the similarity score is increased by 0.1, the candidate text character string is advanced by one, and the input text character string is advanced by two;
(v) if the current character in the candidate text character string is identical to the next character in the input text character string and the current character in the input text character string is identical to the current character in the candidate text character string, the similarity score is increased by 0.25 and both string positions are advanced by two;
(vi) if the current character in the input text character string is identical to the next character in the candidate text character string, the similarity score is increased by 0.5 and the input text character string position is advanced by one and the candidate text character string position is advanced by two;
(vii) if the current character in the candidate text character string is identical to the next character in the input text character string, the similarity score is increased by 0.5 and the candidate text character string position is advanced by one and input text character string position is advanced by two; and
(viii) otherwise, the similarity score is increased by 1.0 and both string positions are advanced by one;
wherein when one of the character strings is exhausted, the total number of characters remaining in the other string as added to the similarity score; and
wherein the final similarity score represents how visually similar the two character strings would appear on a computer screen, where two completely identical character strings would result in a similarity score of 0.0 and the more visually different the two character strings, the higher the similarity score.

18. The system of claim 10, wherein each text character in said model is represented in exactly one look-alike set.

* * * * *